United States Patent Office 3,050,479
Patented Aug. 21, 1962

3,050,479
PROCESS COMPRISING HEAT-TREATING HALOGENATED BUTYL RUBBER IN THE PRESENCE OF A NOVOLAC RESIN AND THEREAFTER CURING, AND PRODUCT OBTAINED THEREBY
George J. Ziarnik, Roselle, N.J., assignor to Esso Research and Engineering Company, a corporation of Delaware
No Drawing. Filed Dec. 24, 1959, Ser. No. 861,746
14 Claims. (Cl. 260—19)

This invention is concerned with a method for heat treating a rubbery polymer, and more particularly, it is concerned with the improved vulcanizate therefrom.

It is known that a vulcanizate can be made from a copolymer of an isoolefin with a multiolefin, or from the same copolymer which has been chemically modified to incorporate halogen in its structure. These vulcanizates have been prepared by heat treating the rubbery polymer in the presence of fillers and promoters, e.g., N-ethyl N-nitroso p-nitroso aniline (Polyac) and N-methyl N-nitroso p-nitroso aniline (Elastopar); cooling the heat-treated rubber to a relatively low temperature; incorporating a curing agent with curing at elevated temperatures to form a rubbery vulcanizate therefrom.

In the past, polymethylol phenol resins have been employed as curing agents. However, these resins required a catalyst such as $SnCl_2$ or $FeCl_3$ for butyl rubber; or ZnO for halogenated butyl rubber.

It has now been discovered that phenol-formaldehyde resins can be used as promoters in the heat treating operation, without catalyst or activator, to provide a vulcanizate therefrom which possesses greatly improved tensile strength. Thus, in accordance with one embodiment of this invention, a rubbery polymer of halogenated butyl rubber is prepared. This rubbery polymer is subsequently heat treated in the presence of a phenol-formaldehyde resin in the absence of catalysts. After cooling the heat-treated rubber, curing agents, e.g., tetramethyl thiuram disulfide (Tuads) and benzothiazyl disulfide (Altax) are incorporated therein, with curing at elevated temperatures ranging from 250 to 400° F. to form a hard rubbery vulcanizate therefrom.

The butyl rubber polymer, which is subsequently halogenated in the instant invention, is prepared by reacting 70 to 99.5 parts by weight, preferably 85 to 99.5 parts, of an isoolefin with 30 to 0.5 parts by weight, preferably 15 to 0.5 parts, of multiolefin. The isoolefin, in general, is a $C_4$ to $C_7$ compound, e.g., isobutylene or 2-methyl-1-butene. The multiolefin, in general, is a $C_4$ to $C_{10}$ conjugated diolefin, e.g., isoprene, butadiene, or piperylene. The preferred polymer is obtained by reacting 95 to 99.5% by weight of isobutylene with 0.5 to 5% by weight of isoprene.

Mixtures of monomers, preferably with 1 to 5 volumes of inert diluent, e.g., methyl chloride, should be cooled to a temperature between 0 and —200° C. and it is preferred that the temperature range be between —60° and —130° C. The cold mixture is polymerized by the addition of a Friedel-Crafts catalyst, preferably an aluminum halide catalyst in a liquid or dissolved form, in conjunction with vigorous agitation. The amount of catalyst is generally about 0.15 to 1.0% by weight of the mixed olefins.

The polymerization reaction is rapid and the polymer precipitates out of the solution in the form of a slurry or flocculent white solid. The polymer, which is recovered and dried, has a Staudinger molecular weight between 20,000 and 150,000, preferably 45,000 to 60,000; and an iodine number between 0.5 and 50, preferably between 1 and 15. The preparation of this copolymer is described in U.S. Patent No. 2,356,128, which is incorporated herein by reference.

The butyl rubber, heretofore described, is halogenated by a substitution reaction to incorporate at least 0.5 weight percent, preferably about 1.0 weight percent, of combined halogen but not more than "X" weight percent fluorine or chlorine, or not more than about 3"X" weight percent combined bromine or iodine therein, in accordance with the following equation:

$$X = \frac{M_3 L}{(100-L)M_1 + L(M_2+M_3)} \times 100$$

wherein $L$ = mole percent of the multiolefin in the polymer
$M_1$ = molecular weight of the isoolefin
$M_2$ = molecular weight of the multiolefin
$M_3$ = atomic weight of a halogen In other words, there should be at least about 0.5 weight percent of combined halogen in the polymer but not more than about one atom of combined fluorine or chlorine or chlorine or 3 atoms of combined bromine or iodine per double bond in the polymer.

The halogenation is generally conducted between about —50° C. and about 200° C., and preferably between 20° and 50° C.; however, the temperature is dependent upon the particular halogenating agent which is used. The time interval is usually within the range of one minute to several hours, e.g., 3 minutes. The pressure may vary from 0.5 to 400 p.s.i.a.; however, atmospheric pressure is preferred. It is desirable to halogenate the butyl rubber copolymer while it is dissolved in a $C_4$ to $C_{10}$ hydrocarbon, a $C_4$ to $C_{10}$ halogenated hydrocarbon, carbon tetrachloride, chloroform, hexane, benzene and/or chlorobenzene.

Suitable halogenating agents which may be employed are gaseous chlorine, liquid bromine, iodine monochloride, hydrogen fluoride, alkali metal hypobromites or hypochlorites, sulfur bromides or chlorides, bromo- or chloro-hydantoins, N-bromosuccinimide, and other common hallogenating agents.

The resulting halogenated butyl rubber polymer may be recovered by precipitating with an alcohol, acetone or any other non-solvent, and subsequently drying at a temperature between 0° and 180° C. within a pressure range from 1 to 760 mm. of Hg. Other methods for recovering the halogenated butyl rubber polymer from the hydrocarbon solution are conventional spray and drum drying techniques.

Alternatively, the solution with the halogenated rubbery polymer therein can be injected into a vessel which contains steam and/or agitated hot water. The temperature must be high enough to flash off the solvent whereby an aqueous slurry halogenated butyl rubber is formed therefrom. The halogenated butyl rubber is subsequently separated from this slurry by filtration. After a drying step, the polymer is recovered as a "crumb," a dense sheet, or a slab, depending upon the milling and extruding procedures which are used.

The halogenated copolymer generally has a viscosity average molecular weight between about 50,000 and 4,000,000. The mole percent unsaturation is usually between 0.5 and 15.0, preferably 0.6 and 5.0.

In accordance with this invention, the halogenated butyl rubber is heat treated with a resol or novolac type substituted phenol-formaldehyde resin. These resol type resins, which are heat-reactive, are generally prepared by reacting a para-substituted or meta-substituted phenol with an excess of formaldehyde in the presence of a strong alkaline catalyst, e.g., an alkali metal hydroxide. The preparation of resol and novolac resins are well known and are described in many texts, e.g. Experimental Plastics and Synthetic Resins by G. F. D'Alelio and Phenoplasts by T. S. Carswell. Generally, a mixture of the phenol, formaldehyde and alkaline catalyst is heated at a temperature between 25 and 100° C. to form a phenol methylol, e.g., parasubstituted 2,6-dimethylol phenol. This material can be isolated by acidification and separation of the oily layer. A higher molecular weight can be formed by heating the product at a temperature between 75° and 175° C. The reaction can be carried past the monomer stage to the resinous stage whereupon the mixture is neutralized and water is removed to give the resinous material. The compounds within the purview of the instant invention are formaldehyde reaction products by alkaline or acid catalysis with: octyl phenol; methyl phenol; tertiary butyl phenol; dodecyl phenol; phenyl phenol; benzyl phenol; (alpha,alpha-dimethylbenzyl) phenol; and cyclohexyl phenol. The substituted phenol formaldehyde resins which are reactive, unreactive or halogenated are generally incorporated within a range of 0.1 to 25 parts, preferably 1 to 10 parts by weight per 100 parts of rubber (phr.).

It should also be noted that the halogenated butyl rubber can also be heat treated with the novolac type resin which is unreactive. This therefore includes a phenol-formaldehyde resin of the type that is capable of being converted by heat to the permanently infusible state in the presence of formaldehyde, or a methylene-yielding curing agent of the type commonly used for curing phenolic resins, such as hexamethylene-tetramine or para-formaldehyde. Such phenolic resins are of the novolac type as distinguished from the inherently heat-reactive resol type previously described as preferred reagents for the pre-reaction of the butyl rubber. The novolac resins are not dimethylol phenols and they are made by limited condensation of phenol with formaldehyde usually in the presence of an acid catalyst, the ratio of phenol to formaldehyde in the reaction mixture being maintained high enough so that the formaldehyde present reacts to form essentially only linear polymer chains with the phenol, there being insufficient formaldehyde to form cross-links between the polymer chains, which would result in an infusible, insoluble product. The novolac type of resin is insoluble in water and is distinguished from the resol type which is usually prepared in an alkaline medium, using larger quantities of formaldehyde. The novolacs are distinguished by the fact that, practically speaking, they are permanently fusible and soluble and do not harden upon being heated unless a curing agent in the form of additional formaldehyde is added. Preferably the phenolic resin is one which has been modified with cashew nut shell oil. Such modified phenolic resins are well-known commercially available materials, as typified by the resin sold under the trade-designation "Durez No. 12686," which is made from cashew nut shell oil and a lower molecular weight phenol. Frequently the commercial form of the resin already contains a sufficient quantity of a methylene-yielding curing agent to render it heat-hardenable, as in the case of the material sold under the trade-designation "Durez No. 12687," which is believed to be a mixture of 92 parts of cashew nut shell oil modified phenolic resin and 8 parts of hexamethylenetetramine. Other commercially available cashew nut shell oil modified phenolic resins, containing a curing agent, are the materials known in the trade as Varcum 9820 and Varcum 9831. If the resin does not already contain a formaldehyde-yielding substance, from 1 to 12 parts of such substance should be added to the mixture, per 100 parts of the halogenated butyl rubber.

In the present invention the reactive, unreactive or halogenated resin is heat treated with halogenated butyl rubber in the absence of catalysts such as ZnO, Zn stearate, $ZnCl_2$, $ZnBr_2$, $FeCl_3$, and $SnCl_2$.

If heat treated with the halogenated butyl rubber in this invention, the halomethyl hydrocarbon-substituted phenol curing agents are provided by halogenating the above polymethylol phenols, e.g., 2,6-dimethylol para-substituted phenols, either in the monomeric or polymeric form, to at least partially substitute halogen for the hydroxyl portion of the methylol groups; or by the controlled halogenating of the afore-mentioned methylol containing resins prepared by the condensation of an aldehyde with a substituted phenol having the two ortho positions unoccupied. This halogenation is generally performed at a temperature between 0 and 150° C., preferably between 20 and 80° C. The halogenating agents which are suitable for the present invention are gaseous hydrogen fluoride, hydrogen chloride, hydrogen bromide, hydrogen iodide, gaseous chlorine, liquid bromine, alkali metal hypochlorites or hypobromites, concentrated aqueous hydrogen iodine solutions, $C_4$ to $C_{10}$ tertiary alkyl hypochlorites, sulfur bromides, sulfuryl chloride, pyridinium chloride perchloride, N-bromosuccinimide, alpha-chloroacetoacetanilide, N,N'-dichloro-5,5 dimethylhydantoin, iodine halides, trichlorophenol chloride, N-chloroacetamide, beta-bromo-methyl phthalimide, etc. The preferred halogenating agents are gaseous hydrogen fluoride, hydrogen chloride, hydrogen bromide, hydrogen iodide, and chlorine. Generally the polymethylol compound or resin is halogenated in the presence of an inert organic solvent, e.g., hexane, benzene, chloroform, or carbon tetrachloride by forming a 20 to 50 wt. percent solution which is subsequently contacted with a halogenating agent for a few minutes up to several days, depending upon the reactivity of the specific halogenating agent. The amount of halogenating agent employed will vary from 0.3 to 4 moles per mole of polymethylol phenol and the halogenated polymethylol hydrocarbon-substituted phenol can contain from 1 to 60 wt. percent of combined halogen. The monomeric form of these compounds can be represented by the following general structure:

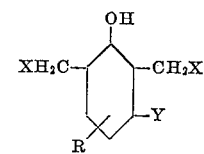

wherein R is an alkyl, aryl, or alkaryl hydrocarbon containing 4 to 16 carbon atoms located in the meta or para position (4-5 position): X is a halogen such as fluorine, chlorine, bromine, or iodine; and Y is hydrogen or hydroxy. This therefore includes the following compounds: 2,6-dichloromethyl-4-tertiarybutyl phenol, 2,6-dichloromethyl-4-octyl phenol, 2,6-diiodomethyl - 4 - dodecyl phenol, 2,6-dichloromethyl - 4 - phenyl phenol, 2,6-dibromomethyl - 5 - pentadecyl phenol, 2,6-dibromomethyl-5-pentadecyl resorcinol and 2,6-dibromomethyl - 4 - cumyl phenol. If desired, these compounds may be blended with unreactive or reactive polymethylol compounds or resins to obtain a composition having the desired curing rate.

In addition to the substituted phenol formaldehyde resin as a promoter, the halogenated rubbery copolymer can also be heat treated with other compounding ingredients such as mineral fillers, e.g., hydrated silica and 2,2'-methylene (4-methyl-6-tertiary butyl) phenol (Antioxidant 2246). The heat treating operation can be performed statically; dynamically, e.g., hot milling; or with intermediate combinations of alternate or cyclic static heating followed by a short interval of mastication. The heat treatment temperature is generally within the range of 200° to 450° F., preferably from 200° to 350° F. The time is inversely dependent upon the temperature, and ranges from 1 to 8 hours with static heating at 250° F., and ranges from 1 to 30 minutes with dynamic heating at 200° to 350° F.

The heat treatment should be terminated with a final mastication and/or mixing to provide a mixture which is homogeneous and is in a smooth workable condition.

The heat-treated rubbery mixture is subsequently cooled to a temperature below 200° F. in order to incorporate curing agents without scorching occurring therein. These curing agents are generally added at a temperature between 100° and 150° F. The usual curing agents are 0.5 to 3 parts of sulfur phr.; 0.5 to 5 parts of accelerators phr., e.g., tetramethyl thiuram disulfide, 2-mercaptobenzothiazole, benzothiazole disulfide, bis-4-ethylthiazole disulfide, diphenyl guanidine, butyraldehyde-aniline products, zinc dimethyldithiocarbamate, thiazole guanidine, aldehydeamines, thiazolines, imidazolines, thioureas, and dithiols. Other compounding agents, which may be incorporated into the heat treated rubbery mixture after it has been cooled, include non-sulfur curing agents such as p-dinitrosobenzene, p-quinone dioxime, polyhydroxy aromatics, and polyamines; antioxidants and stabilizers, e.g., stearic acid; zinc oxide; pigments and/or dyes; processing aids, e.g., waxes, resins and/or oils; extenders, e.g., nonvolatile mineral oils and/or esters.

After the curing agents and other compounding agents have been incorporated in the heat-treated rubbery polymer, the composition therefrom is extruded or molded into any desired form. The extruded admixture is subsequently cured by heating to a moderate temperature between 250° and 270° F. for 240 to 60 minutes, or by heating to a relatively high temperature between 300° and 400° F. for 5 to 0.5 minutes.

Thus, in accordance with this invention, a vulcanizate is formed which has a relatively high physical strength and therefore it can be used in applications requiring improved resistance to prolonged exposure to steam and hot water. Experience has shown that improvements are also found in steam and hot water hose applications. Furthermore, when a phenol formaldehyde resin is used as a promoter in the heat-treating operation catalysts do not have to be present in the operation.

The following examples are submitted to illustrate and not to limit this invention.

*Example I*

A rubbery copolymer was prepared comprising 97.5 percent of isobutylene with 2.5 percent isoprene. This polymer was reacted with gaseous chlorine in n-hexane as a solvent to incorporate 1.2 percent of chlorine in its structure by a substitution reaction. One hundred parts of the halogenated rubbery copolymer were mixed with the following compounds listed herebelow:

| Compound | Phr. | | |
|---|---|---|---|
| | A | B | C |
| Antioxdant 2246 [a] | 1 | 1 | 1 |
| MgO | 4 | 4 | 4 |
| Hi-Sil [b] | 50 | 50 | 50 |
| Stearic Acid | 1 | 1 | 1 |
| Amberol ST-137X [c] | | 3 | |
| Amberol ST-137 [d] | | | 5 |

[a] 2,2'-methylene (4-methyl 6 tertiary butyl) phenol.
[b] Hydrated silica.
[c] Unreactive phenol formaldehyde resin of Rohm and Haas.
[d] Heat reactive phenol formaldehyde resin of Rohm and Haas.

These admixtures were placed on a 6-inch roll mill at a temperature of 270° F. for 10 minutes. The heat-treated rubbery polymer therefrom was cooled to a temperature of 80° F. and 1 part of tetramethylthiuram disulfide, 2 parts of benzothiazyl disulfide and 3 parts of zinc oxide were incorporated therein. This composition was cured for either 30 or 60 minutes at 320° F. and the physical properties of each vulcanizate were determined as shown herebelow:

30 MINUTE CURE

| Physical Properties | A | B | C |
|---|---|---|---|
| Tensile strength (p.s.i.) | 1,975 | 2,305 | 2,470 |
| Elongation (Percent) | 700 | 655 | 675 |
| Shore Hardness | 54 | 50 | 50 |

60 MINUTE CURE

| Physical Properties | A | B | C |
|---|---|---|---|
| Tensile Strength (p.s.i.) | 2,040 | 2,305 | 2,575 |
| Elongation (Percent) | 730 | 750 | 655 |
| Shore Hardness | 57 | 47 | 50 |

*Example II*

The halogenated rubbery copolymer of Example I was compounded with the following ingredients to eventually form vulcanizates E, F and G:

| Compound | Phr. | | |
|---|---|---|---|
| | E | F | G |
| Halogenated Rubbery Copolymer | 100 | 100 | 100 |
| Antioxidant 2246 | 1 | 1 | 1 |
| MgO | 4 | 4 | 4 |
| Hi-Sil 233 | 50 | 50 | 50 |
| Stearic acid | 1 | 1 | 1 |
| Amberol ST-137 | | | 3 |
| Amberol ST-137X | | 3 | |

This compounded rubber, with or without the resin therein as a promoter, was heated directly in a Struthers-Wells mixer at a temperature of 300° F. All ingredients were included within 2.5 minutes and the heat treatment was conducted within 8 minutes. The heat-treated polymer was then cooled to a temperature of 80° F. and the following curatives were incorporated therein on a cold mill: 1 part tetramethylthiuram disulfide, 2 parts benzothiazyl disulfide, and 3 parts ZnO phr. The heat-treated polymer with the curatives therein were subsequently cured at a temperature of 307° F. for either 30 or 60 minutes. The physical properties of the vulcanizates therefrom are indicated in the table below:

30 MINUTE CURE

| Physical Properties | E | F | G |
|---|---|---|---|
| Tensile Strength (p.s.i.) | 1,075 | 1,655 | 1,270 |
| Elongation (Percent) | 563 | 773 | 690 |
| Shore Hardness | 67 | 60 | 59 |

60 MINUTE CURE

| Physical Properties | E | F | G |
|---|---|---|---|
| Tensile Strength (p.s.i.) | 1,295 | 1,800 | 1,607 |
| Elongation (Percent) | 630 | 803 | 730 |
| Shore Hardness | 65 | 62 | 58 |

Examples I and II demonstrate that the tensile strength of a vulcanizate is substantially increased by incorporating a substituted phenol-formaldehyde resin as a promoter in the heat treatment of a chlorinated copolymer of isobutylene with isoprene. Furthermore, it is unexpected that the heat treatment can be performed in the absence of ZnO at these temperatures in such relatively short times. In addition, it is surprising that the unreactive phenol-formaldehyde resin not only is effective but also is superior to the reactive type resin.

*Example III*

The halogenated copolymer of Example I was compounded with the following ingredients to eventually form vulcanizates H, I, and J:

| Compound | Phr. | | |
|---|---|---|---|
| | H | I | J |
| Halogenated Rubbery Copolymer | 100 | 100 | 100 |
| MgO | 4 | 4 | 4 |
| Hi-Sil 233 | 50 | 50 | 50 |
| Stearic Acid | 1 | 1 | 1 |
| Amberol ST-137X | | | 3 |

These admixtures were placed on a 6-inch roll mill at a temperature of 290° F. for 10 minutes. The heat-treated rubbery polymer therefrom was cooled to a temperature of 80° F. and 1 part of tetramethyl thiuram disulfide, 2 parts of benzothiazyl disulfide, and 3 parts of zinc oxide were incorporated therein.

In addition to these curatives, 3 phr. of Amberol ST-137X was added to vulcanizate I during the finalizing process (i.e., with curatives after the heat-treating process).

These compositions were cured for 60 minutes at 307° F. and the physical properties of each vulcanizate were determined as shown herebelow:

| Vulcanizate | H | I | J |
|---|---|---|---|
| | No amberol | Amberol added with curatives after heat treating | Amberol added before heat treating |
| Physical Properties: | | | |
| Tensile Strength (p.s.i.) | 1,870 | 2,000 | 2,600 |
| Elongation (%) | 675 | 675 | 750 |
| Shore Hardness | 54 | 53 | 51 |

Vulcanizate J shows the pronounced improvement that can be obtained in physical properties by using the phenol-formaldehyde resin as a heat-treating promoter without an activator. The tensile strength is far superior to that of vulcanizate I in which the polymethylol-phenol resin is used as a curative with the ZnO activator.

*Example IV*

The halogenated copolymer of Example I was compounded with the following ingredients to eventually form vulcanizates K and L:

| Compound | K | L |
|---|---|---|
| Halogenated Rubbery Copolymer | 100 | 100 |
| MgO | 2 | 2 |
| Antioxidant 2246 | 1 | 1 |
| Mistron Vapor Talc | 70 | 70 |
| Amberol ST-137X | 3 | 3 |
| Stearic Acid | 1 | 1 |

Compound K was subsequently heat treated on a 6-inch roll mill at 300° F. for 10 minutes and then cooled to room temperature. Compound L received no additional heat treatment. Both compounds were finalized by the addition of curatives (tetramethylthiuram disulfide 1 phr., benzothiazyl disulfide 2 phr., zinc oxide 3 phr.) at room temperature. The compositions were then cured for 60 minutes at 307° F. and the physical properties of each vulcanizate were determined as shown herebelow:

| Physical Properties | K | L |
|---|---|---|
| Tensile Strength, (p.s.i.) | 1,645 | 1,470 |
| Elongation | 745 | 745 |

Vulcanizate K shows that the heat-treating process of this invention is also effective in other fillers such as talc.

*Example V*

The following recipe was provided in conjunction with curing similar to Example III:

| Compound | M | N | O |
|---|---|---|---|
| MD-551 [a] | 100 | 100 | 100 |
| Maglite K | 4 | 4 | 4 |
| Hi-Sil | 50 | 50 | 50 |
| Stearic Acid | 1 | 1 | 1 |
| Amberol ST-137X | 3 | | |
| SP-1055 [b] | | 3 | |
| Tuads | 1 | 1 | 1 |
| Altax | 2 | 2 | 2 |
| ZnO | 3 | 3 | 3 |
| Cure, 307° F./60′. | | | |
| Tensile Strength | 2,600 | 2,475 | 1,870 |
| Elongation | 755 | 760 | 675 |

[a] Copolymer of Example I.
[b] A bromo-resin.

This example indicates that a halogenated phenolformaldehyde resin can be employed in the present invention.

Having described the general nature and physical embodiments of the present invention, the true scope is now particularly pointed out in the appended claims.

What is claimed is:

1. A method which comprises preparing a rubbery copolymer of a major amount of an isoolefin with a minor amount of a multiolefin which has been modified to incorporate a halogen therein; heat treating 100 parts of said copolymer in the presence of 1 to 25 parts of a novolac acid catalysed phenol-formaldehyde resin in the absence of catalysts selected from the group consisting of ZnO, $ZnCl_2$, $ZnBr_2$, $FeCl_3$, $SnCl_2$ and Zn stearate at a temperature between 200° and 350° F.; cooling said heat-treated copolymer below 150° F.; and curing said cooled heat-treated copolymer at a temperature between 250° and 400° F. to provide a vulcanizate therefrom with improved physical properties.

2. The method according to claim 1 in which the halogenated rubbery copolymer has chlorine incorporated in its structure.

3. The method according to claim 1 in which the halogenated rubbery copolymer has bromine incorporated in its structure.

4. The method according to claim 1 in which the rubbery polymer is the copolymer of isobutylene with isoprene.

5. The method according to claim 1 in which 100 parts of the rubbery copolymer are heat treated with 1 to 10 parts of the resin.

6. The method according to claim 1 in which the curing is performed in the presence of tetramethyl thiuram disulfide and benzothiazyl disulfide.

7. A composition which has been prepared by providing a rubbery polymer of a major amount of an isoolefin with a minor amount of a multiolefin which has been modified to incorporate a halogen in its structure; heat treating 100 parts of said polymer in the presence of 1 to 25 parts of a novolac acid catalyzed phenol-formaldehyde resin in the absence of catalysts selected from the group consisting of ZnO, $ZnCl_2$, $ZnBr_2$, $FeCl_3$, $SnCl_2$ and Zn stearate at a temperature between 200° and 350° F.; cooling said heat-treated rubbery copolymer at a temperature below 150° F. and curing said cooled polymer at a temperature between 250° and 400° F. to provide a vulcanizate therefrom with increased strength.

8. The composition according to claim 7 in which the halogenated rubbery polymer has chlorine incorporated in its structure.

9. The composition according to claim 7 in which the halogenated rubbery polymer has bromine incorporated in its structure.

10. The composition according to claim 7 in which the polymer is the copolymer of isobutylene with isoprene.

11. The composition according to claim 7 in which 100 parts of the rubbery polymer are heat treated with 1 to 10 parts of the resin.

12. The composition according to claim 7 in which the curing is performed in the presence of tetramethyl thiuram disulfide and benzothiazyl disulfide.

13. A method which comprises preparing a rubbery copolymer of 97.5% isobutylene with 2.5% isoprene which has been modified to incorporate 1.2% chlorine therein; heat treating 100 parts of said copolymer in the presence of 1 part 2,2'-methylene (4-methyl-6-tertiary butyl) phenol, 4 parts of MgO, 50 parts of hydrated silica, 1 part of stearic acid, and 3 parts of novolac acid catalyzed phenol-formaldehyde resin and in the absence of ZnO at a temperature of 300° F. for 8 minutes; cooling said heat-treated rubbery copolymer to a temperature of 80° F.; and curing said cooled polymer at a temperature of 307° F. for 60 minutes in the presence of 1 part tetramethylthiuram disulfide, 2 parts of benzothiazyl disulfide, and 3 parts ZnO to provide a vulcanizate therefrom with a tensile strength of 1800 p.s.i.

14. A composition which has been prepared by providing a rubbery copolymer of 97.5% isobutylene with 2.5% isoprene which has been modified to incorporate 1.2% chlorine therein; heat treating 100 parts of said copolymer in the presence of 1 part 2,2'-methylene (4-methyl-6-tertiary butyl) phenol, 4 parts of MgO, 50 parts of hydrate silica, 1 part of stearic acid, and 3 parts of novolac acid catalyzed phenol-formaldehyde resin and in the absence of ZnO at a temperature of 300° F. for 8 minutes, cooling said heat-treated rubbery copolymer to a temperature of 80° F.; and curing said cooled polymer at a temperature of 307° F. for 60 minutes in the presence of 1 part tetramethylthiuram disulfide, 2 parts of benzothiazyl disulfide, and 3 parts ZnO to provide a vulcanizate therefrom with a tensile strength of 1800 p.s.i.

References Cited in the file of this patent
UNITED STATES PATENTS

| | | |
|---|---|---|
| 2,701,895 | Tawney et al. | Feb. 15, 1955 |
| 2,702,287 | Iknayan et al. | Feb. 15, 1955 |
| 2,788,839 | Kindle et al. | Apr. 16, 1957 |
| 2,839,443 | Fleming | June 17, 1958 |
| 2,857,357 | Smith | Oct. 21, 1958 |
| 2,955,102 | Clayton et al. | Oct. 4, 1960 |